US012680612B2

(12) United States Patent
Heeger et al.

(10) Patent No.: US 12,680,612 B2
(45) Date of Patent: Jul. 14, 2026

(54) LOCKING DEVICE, ELECTRIC MOTOR DRIVE UNIT, AND VEHICLE

(71) Applicant: Schaeffler Technologies AG & Co. KG, Herzogenaurach (DE)

(72) Inventors: Christof Heeger, Gelnhausen (DE); Karl Martin Fritsch, Battenberg (DE); Jens Henrich, Schmitten (DE); Philip Kieper, Königstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/993,935

(22) PCT Filed: Jul. 10, 2023

(86) PCT No.: PCT/EP2023/069083
§ 371 (c)(1),
(2) Date: Jan. 13, 2025

(87) PCT Pub. No.: WO2024/013117
PCT Pub. Date: Jan. 18, 2024

(65) Prior Publication Data
US 2026/0016087 A1    Jan. 15, 2026

(30) Foreign Application Priority Data
Jul. 15, 2022    (DE) .................... 10 2022 207 258.8

(51) Int. Cl.
*F16H 63/34*        (2006.01)
*H02K 7/00*        (2006.01)
(Continued)

(52) U.S. Cl.
CPC ..... *F16H 63/3466* (2013.01); *F16H 63/3433* (2013.01); *H02K 7/003* (2013.01); *H02K 7/116* (2013.01); *H02K 11/33* (2016.01)

(58) Field of Classification Search
CPC . F16H 63/3466; F16H 63/3433; H02K 7/003; H02K 7/116; H02K 11/33
See application file for complete search history.

(56) References Cited

U.S. PATENT DOCUMENTS

| | | | | |
|---|---|---|---|---|
| 4,318,098 | A | * | 3/1982 | McGreevy .............. G09F 9/375 |
| | | | | 345/111 |
| 2004/0072646 | A1 | * | 4/2004 | Hori ..................... H02K 19/103 |
| | | | | 475/149 |

(Continued)

FOREIGN PATENT DOCUMENTS

| | | |
|---|---|---|
| DE | 102018203453 | 9/2019 |
| DE | 112019002057 | 12/2020 |

(Continued)

OTHER PUBLICATIONS

Office Action of corresponding German Patent Application No. DE 10 2022 207 258.8, dated May 24, 2023.

*Primary Examiner* — Farhana Pervin
(74) *Attorney, Agent, or Firm* — COZEN O'CONNOR

(57) ABSTRACT
A locking device for an electric motor drive unit having a locking mechanism for locking a lockable shaft of the electric motor drive unit and an electric drive for actuating the locking mechanism received by a housing of the locking device together with the locking mechanism. The housing receives a position sensor assembly that comprises a signal transmitter and a sensor component, which interacts with the signal transmitter and detects the position of a rotor of an electric motor to commutate the electric motor.

8 Claims, 5 Drawing Sheets

(51) Int. Cl.
    *H02K 7/116*       (2006.01)
    *H02K 11/33*      (2016.01)

(56)         References Cited

U.S. PATENT DOCUMENTS

| | | | |
|---|---|---|---|
| 2009/0179528 A1* | 7/2009 | Omura | H02K 11/22 |
| | | | 310/67 R |
| 2019/0154149 A1* | 5/2019 | Gruber | B60K 1/00 |
| 2019/0249752 A1* | 8/2019 | Jung | H02K 7/116 |
| 2019/0338853 A1 | 11/2019 | Boralkar et al. | |
| 2020/0103024 A1* | 4/2020 | Jeon | F16H 63/3425 |
| 2020/0336039 A1* | 10/2020 | Kume | H02K 11/33 |
| 2020/0336040 A1 | 10/2020 | Kume et al. | |
| 2020/0340578 A1* | 10/2020 | Shimada | F16H 61/32 |
| 2020/0340579 A1* | 10/2020 | Shimada | F16H 61/32 |
| 2022/0294371 A1* | 9/2022 | Yamamoto | H02P 6/16 |
| 2022/0393550 A1* | 12/2022 | Fujii | H02K 21/02 |
| 2023/0014292 A1* | 1/2023 | Fuchs | E05B 77/32 |
| 2023/0023273 A1* | 1/2023 | Kawabata | H02K 7/14 |
| 2023/0055495 A1* | 2/2023 | Suzuki | H02K 11/21 |
| 2023/0417322 A1* | 12/2023 | Roussel | F16H 61/32 |
| 2024/0146157 A1* | 5/2024 | Fichtner-Pflaum | H02H 11/33 |
| 2024/0318719 A1* | 9/2024 | Heeger | F16H 63/3441 |

FOREIGN PATENT DOCUMENTS

| | | |
|---|---|---|
| DE | 102021213737 | 6/2023 |
| DE | 102021213739 | 6/2023 |
| EP | 3478992 | 4/2020 |
| WO | WO 2018001476 | 1/2018 |

* cited by examiner

SV

SV-G

EM-AE

RG

EM-G

SV

EM

LOCKING DEVICE, ELECTRIC MOTOR DRIVE UNIT, AND VEHICLE

CROSS REFERENCE TO RELATED APPLICATIONS

This is a U.S. national stage of Application No. PCT/EP2023/069083 filed Jul. 10, 2023. Priority is claimed on German Application No. DE 10 2022 207 258.8 filed Jul. 15, 2022, the contents of which are incorporated herein by reference.

BACKGROUND OF THE INVENTION

1. Field of the Invention

The disclosure relates to a locking device for an electric motor drive unit, to an electric motor drive unit comprising such a locking device, and to a vehicle comprising such an electric motor drive unit.

2. Description of the Related Art

The locking device proposed in the context of this disclosure is a further development of the locking devices described in the German patent applications with the file references 10 2021 213 737.7 and 10 2021 213 739.3.

SUMMARY OF THE INVENTION

One of the problems addressed by one aspect of the invention is to provide an improved locking device, in particular for a vehicle.

A locking device for an electric motor drive unit is proposed. The locking device has a locking mechanism for locking a lockable shaft of the electric motor drive unit and an electric drive for actuating the locking mechanism, the drive being received by a housing of the locking device together with the locking mechanism.

The locking mechanism comprises a form-fit element that can be actuated in an axial stroke movement and along the shaft and that can be form-fittingly joined to a shaft-side complement within a form-fit region, at least in portions, in order to lock the shaft.

In one state, this actuatable form-fit element, in a state in which it rests against the shaft-side complement on its front side, can be latchably pretensioned or braced in a defined manner against the shaft-side complement along the shaft by at least one elastic force transmission element.

In a locking state of the shaft, in which the actuatable form-fit element and the shaft-side complement engage with one another in the form-fit region of the locking mechanism, the actuatable form-fit element is supported against a housing portion of an electric motor drive unit to which the locking actuator is attached.

In the form-fit region and in the circumferential direction of the shaft, the locking mechanism has a movement clearance between the actuatable form-fit element and the shaft-side complement, which, in conjunction with said or aforementioned pretensioning/bracing of the actuatable form-fit element against the shaft-side complement, enables the actuatable form-fit element to latch with the shaft-side complement or enables the actuatable form-fit element to join with the shaft-side complement.

A shaft-side complement is to be understood here as a shaft-side counterpart to the actuatable form-fit element, which counterpart is designed or shaped to complement the actuatable form-fit element in the form-fit region. This can be a correspondingly shaped portion of the shaft itself or a separate and correspondingly shaped element joined to the shaft, which interacts form-fittingly with the actuatable form-fit element.

In this context, an elastic force transmission element is understood to be a mechanical energy accumulator for elastic pretensioning/bracing of the actuatable form-fit element against the shaft-side complement, for example in the form of at least one separate spring or a separate spring element and/or in the form of at least one spring element portion integrated into the actuatable form-fit element.

This energy accumulator pretensions the actuatable form-fit element against the shaft-side complement until the shaft assumes or experiences a suitable alignment for form fit relative to the actuatable form-fit element. As soon as such an alignment is achieved, this energy store presses the actuatable form-fit element into the shaft-side complement to engage, so that the shaft is locked or blocked.

In addition, the locking mechanism can be actuated in an energy-saving manner, as it does not require high actuating forces to be applied either for said actuation or for said pretensioning/bracing. When joining the actuatable form-fit element with the shaft-side complement, specifically only the actuatable form-fit element is moved and not the element of a drive train to be locked.

The housing of the locking device also receives a position sensor assembly that comprises a signal transmitter and a sensor component, which interacts with the signal transmitter and is at least partly made of metal, wherein this sensor assembly detects a position of a rotor of an electric motor of the electric motor drive unit, said rotor being connected to the shaft, in order to commutate the electric motor.

Such a locking device advantageously contributes to the reduction of components and thus installation space. This also has the advantage of simplifying the assembly outlay.

In one embodiment, the signal transmitter is fixed to the housing and the sensor component is fixed to the shaft.

In a further embodiment, the housing also receives a multifunctional shaft adapter for connection to the lockable shaft, which is substantially made of a plastic and in which contacts for external excitation of a rotor of a synchronous machine of the electric motor drive unit, said rotor being connected to the shaft, are embedded, wherein the plastic of the shaft adapter is connected in an integrally bonded manner to a form-fit element for connection to the shaft, wherein the sensor component is received by the plastic of the shaft adapter and in a fixed position.

A further form-fit element of the locking mechanism can be form-fittingly actuated against this form-fit element of the shaft adapter—this is the shaft-side form-fit element—in an axial stroke movement and along the shaft to lock the shaft.

The proposed shaft adapter enables, on the one hand, a locking or latching function of the locking device, as it is part of the locking mechanism of the locking device, and, on the other hand, said external excitation of the synchronous machine.

In one aspect of the invention, the sensor component is formed as a disk-like element and is at least partly made of metal.

In one aspect of the invention, the signal transmitter is formed as an integral part of a printed circuit board and the disk-like element is arranged opposite the printed circuit board.

In one aspect of the invention, the printed circuit board also has motor electronics for controlling the electric drive in addition to sensor electronics for the position sensor assembly.

In one aspect of the invention, the contacts of the shaft adapter comprise at least two slip rings for contacting with an associated brush and at least one conductor track associated with the respective slip ring, which conductor track extends from the associated slip ring through the plastic of the shaft adapter.

In one aspect of the invention, the electric drive is arranged transversely to the shaft. Such a transverse arrangement advantageously creates installation space to receive said contacts through the housing of the locking device.

The term "transverse" means either an orthogonal arrangement of the electric drive to the shaft or an arrangement in which a longitudinal axis of the electric drive forms an acute or obtuse angle with a longitudinal axis of the lockable shaft.

The housing of the locking device also receives at least two brushes for external excitation of the rotor of the synchronous machine of the electric motor drive unit, the rotor being connected to the shaft.

In a further embodiment, the brushes are arranged radially to the shaft. Such a radial arrangement also favors a compact design of the locking device.

It is proposed that the brushes be placed or contacted in a spring-loaded manner against an associated slip ring of the contacts. This ensures that the brushes, which wear out over time, are tracked against the associated slip rings.

Furthermore, an electric motor drive unit is proposed, in particular for driving a vehicle with a locking device of the type described above, which is attached to a housing of the electric motor of the electric motor drive unit.

In addition, a vehicle comprising an electric motor drive unit of the type described above is proposed.

A vehicle is defined as any type of vehicle or motor vehicle which is driven by an electric motor, but in particular passenger cars and/or commercial vehicles. These are preferably semi-autonomous and, in particular, fully autonomous vehicles.

BRIEF DESCRIPTION OF THE DRAWINGS

The invention is explained with reference to figures in greater detail. The dependent claims and the following description of preferred embodiments provide further advantageous developments of the invention. In this respect:

DETAILED DESCRIPTION OF THE PRESENTLY PREFERRED EMBODIMENTS

The proposed locking device SV is attached to an electric motor drive unit EM-AE, in particular for driving a vehicle. The electric motor drive unit EM-AE comprises an electric motor EM in the form of an externally excited synchronous machine and a reduction gearing RG connected to it. The locking device SV is arranged on a housing EM-G of the synchronous machine.

Figure 1B:
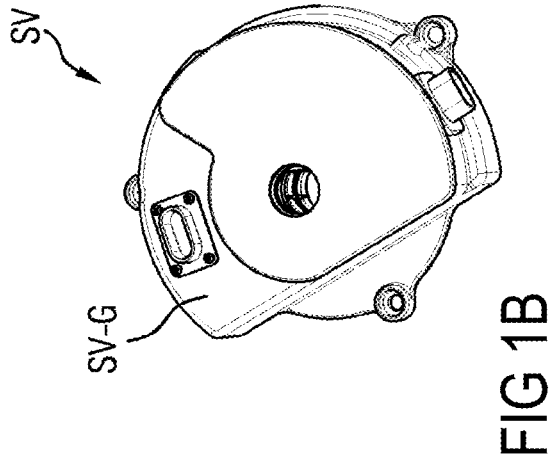
FIG. 1B is a separate, perspective and enlarged view of part of the locking device.
Figure 1A:
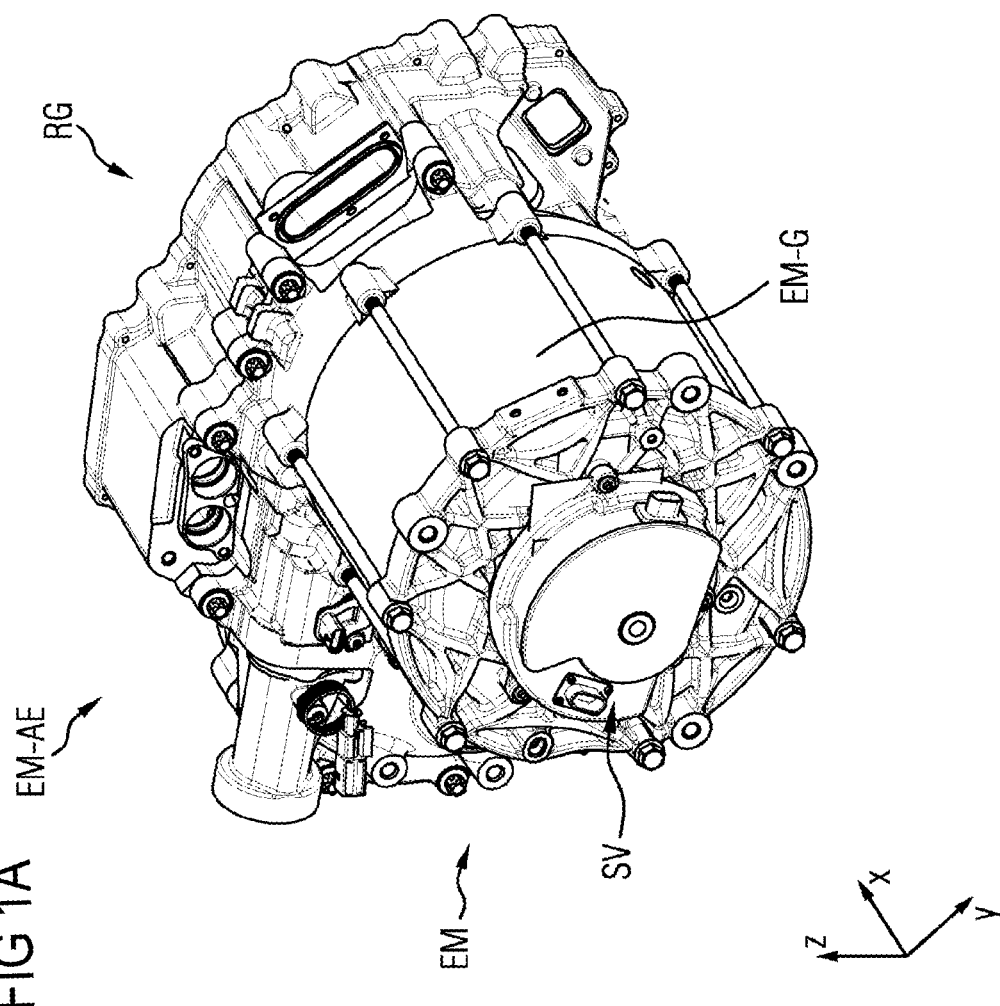
FIG. 1A is a perspective view of an electric motor drive unit with a proposed locking device.
Figure 2:
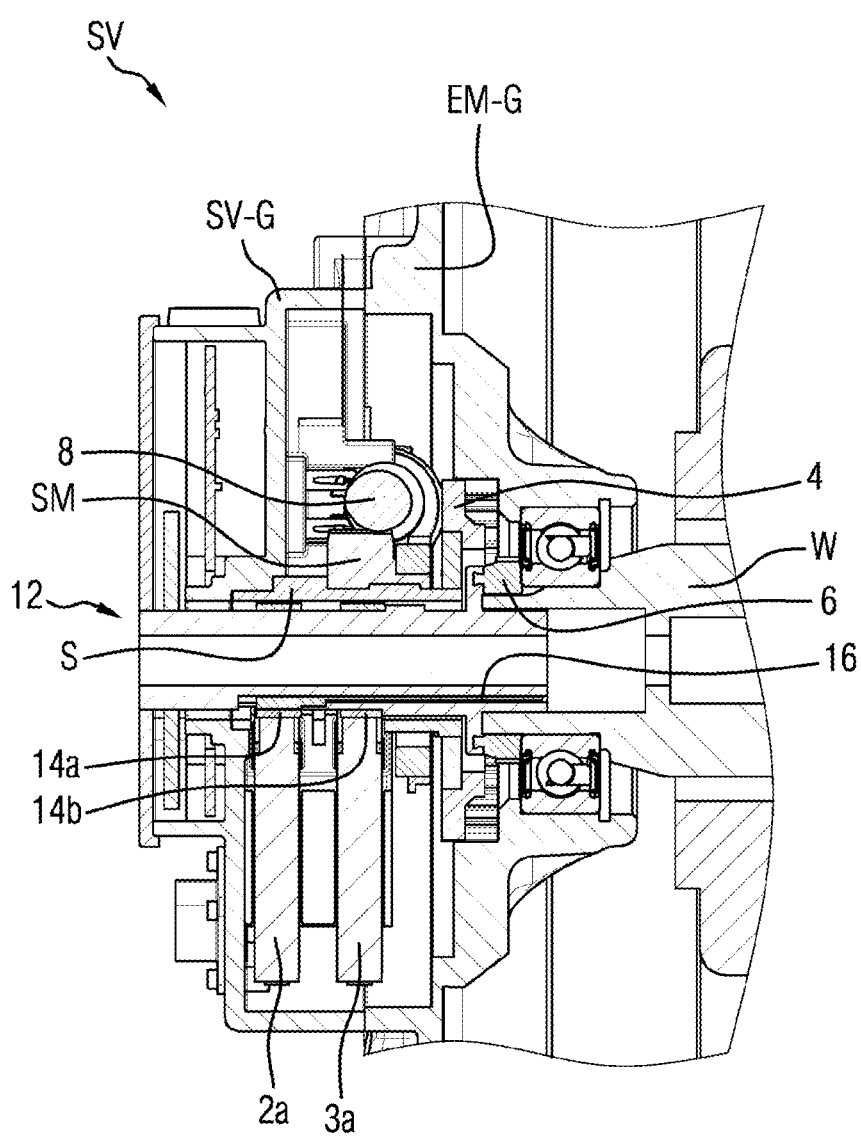
FIG. 2 is the locking device shown in FIG. 1 in a two-dimensional sectional view.
Figure 2:
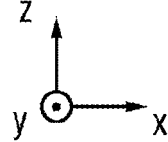

The locking device SV has a locking mechanism and an electric drive EA for actuating the locking mechanism, which is received together with the drive EA by a housing SV-G of the locking device. FIG. 2, for example, illustrates very clearly that a housing portion EM-G of the synchronous machine also forms the housing SV-G of the locking device.

The drive EA is arranged transversely—and orthogonally—to the shaft W or shaft axis X-X. In an aspect not shown here, the drive EA can also be arranged relative to the shaft in such a way that a longitudinal axis of the drive EA forms an acute or obtuse angle with the longitudinal axis X-X of the shaft W.

The drive EA drives a helical gear shaft 8, which in turn interacts with a gear segment 10 of a spindle nut SM with an internal thread. This spindle nut SM is longitudinally displaceably joined to a spindle S with a corresponding external thread, which together with the spindle nut SM forms a so-called screw drive or a so-called screw gear, which converts a rotational movement of the spindle nut SM (counterclockwise or clockwise) into a translational movement of the spindle nut SM along the spindle S and in the longitudinal direction X-X or along the shaft W. The spindle S is fixed in relation to the housing SV-G and is supported against the housing SV-G (FIG. 2).

Figure 3:
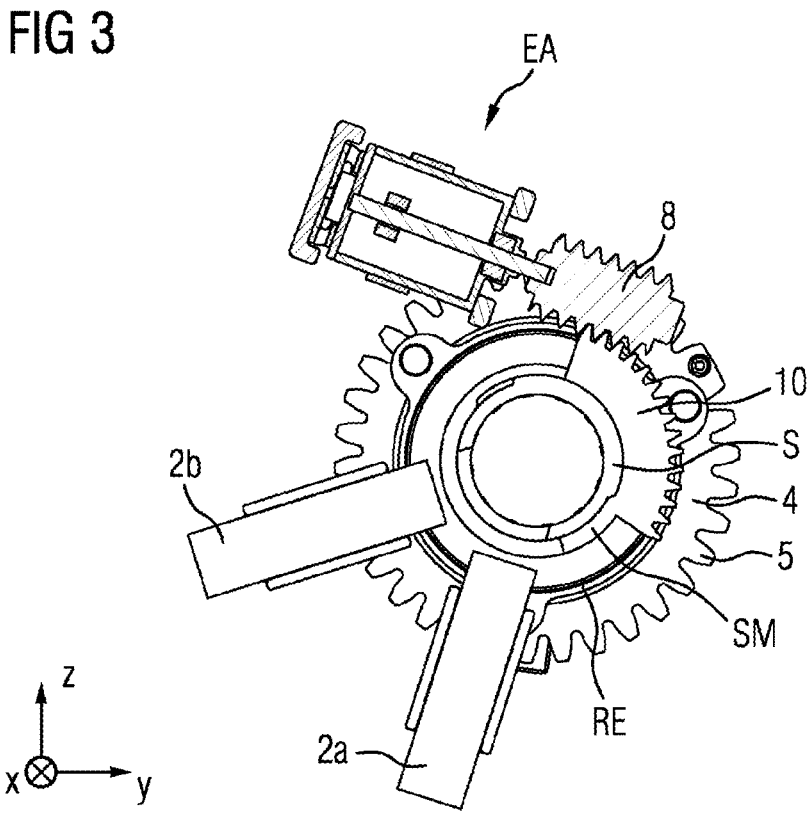
FIG. 3 is a locking mechanism of the locking device together with an arrangement of contacts.
Figure 4:
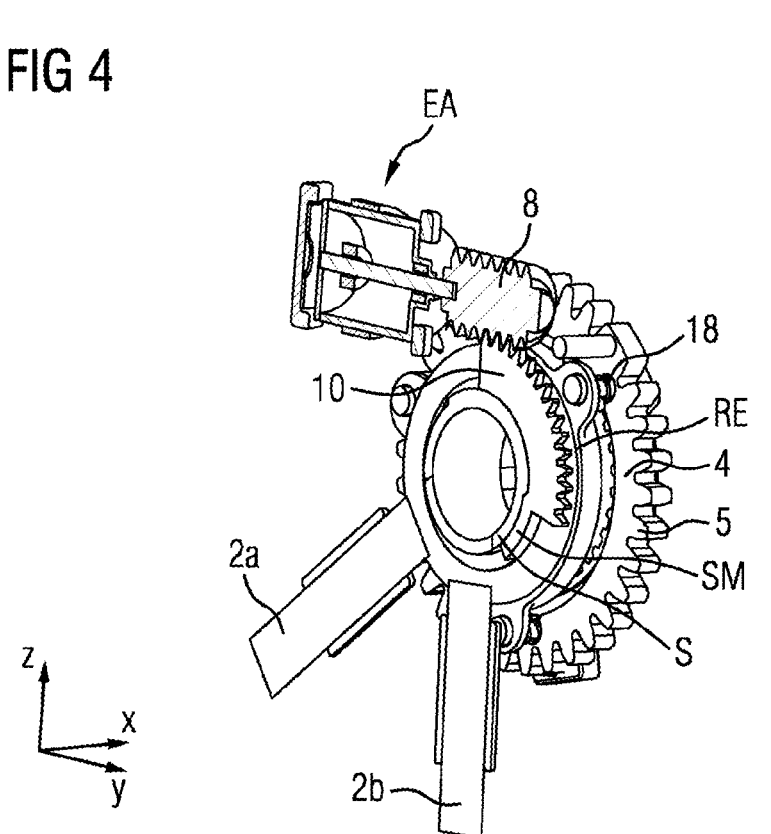
FIG. 4 is a perspective view of the arrangement, shown in FIG. 3, of the locking mechanism and the contacts.
Figure 5:
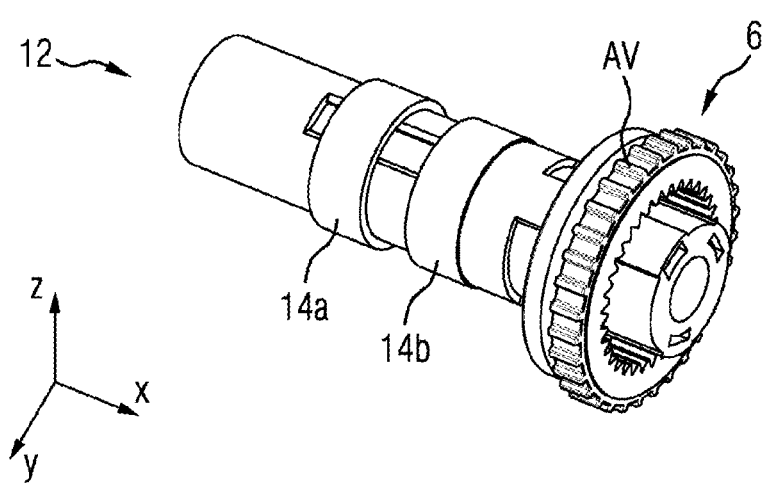
FIG. 5 is a multifunctional shaft adapter of the locking device.

On the shaft side, the spindle nut SM is elastically pretensioned via a ring element RE, which is held by the spindle nut SM itself with low friction via a roller bearing, and individual springs, for example in the form of helical springs 18, against a form-fit element 4 that can be actuated in the longitudinal direction X-X or along the shaft W (FIG. 3, FIG. 4).

This form-fit element 4 is thus elastically attached via these helical springs 18—arranged, for example, three distributed over the circumference of the ring element RE—to a movement mechanism of the locking device SV which effects the axial stroke movement of the form-fit element 4.

Figure 7:
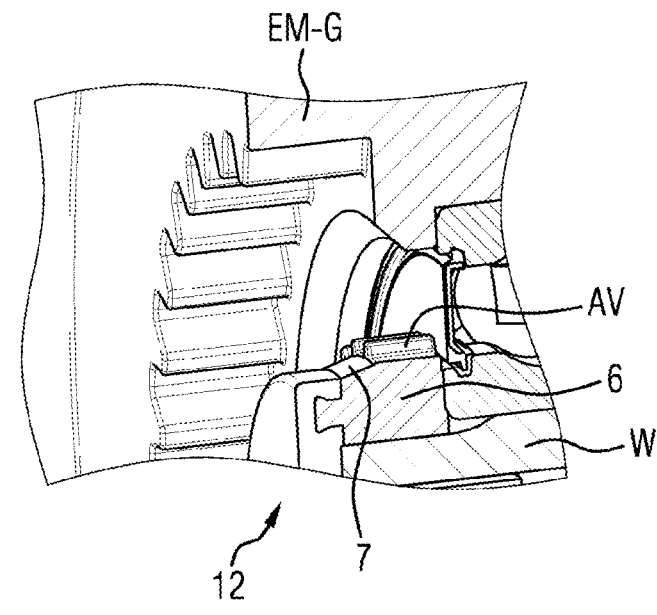
FIG. 7 is an enlarged perspective view of the form-fit region shown in FIG. 6.

This form-fit element 4 is made of metal and high-strength and is designed in the form of a closed, circumferential, ring-shaped element with an internal toothing IV and an external toothing 5. While the internal toothing IV can be moved form-fittingly into an external toothing AV of a high-strength metal complement 6 on the shaft side to lock the shaft W, the external toothing 5 always interacts form-fittingly with a complementary portion of the electric motor housing EM-G. The latter form fit ensures that the form-fit element 4 is guided and supported in relation to the electric motor housing EM-G. This external toothing 5 enables a favorable or uniform force distribution over the circumference of the form-fit element 4 and at the same time a favorable or uniform introduction of force into the electric motor housing EM-G. FIG. 7 illustrates the portion of the electric motor housing EM-G with its internal toothing that is complementary to the external toothing 5. For the sake of simplicity, the form-fit element 4 is not shown, or is hidden or omitted.

In the locked state of the shaft W, both static and dynamic torque loads of the drive train are thus introduced into the electric motor housing EM-G via this external toothing 5.

As an alternative to the external toothing 5, an external profiling of the form-fit element 4 in the form of individual, radial, claw-like projections can also be provided. In this regard, reference is made to the German patent applications already mentioned at the outset with the file references 10 2021 213 737.7 and 10 2021 213 739.3, which describe and illustrate this.

The locking device SV also has a multifunctional shaft adapter 12, which extends through the spindle S and into a region of the hollow shaft W. This shaft adapter 12 is substantially made of a plastic in which two metal slip rings 14*a,* 14*b* and a metal conductor or contact track 16 associated with the respective slip ring 14*a,* 14*b* are embedded. The conductor track 16 extends from the associated slip ring 14*a,* 14*b* in the direction of the hollow shaft W through the plastic of the shaft adapter 12.

Figure 6:
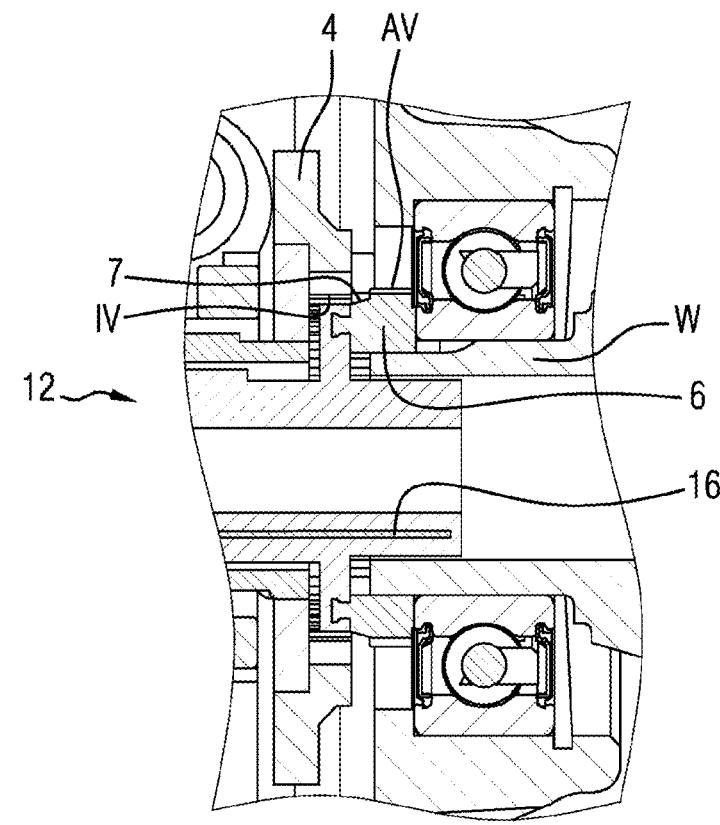
FIG. 6 is a sectional view of a form-fit region between a lockable shaft and the locking device.

Furthermore, the plastic of the shaft adapter 12 is injection-molded or connected in an integrally bonded manner to the shaft-side complement 6, which is in the form of a metal adapter ring. FIG. 6 illustrates an example of an annular projection of the adapter ring or form-fit element 6, which is formed on the end face of the adapter ring 6 and facing the form-fit element 4 in the shape of a dovetail and is enclosed by a plastic flange of the shaft adapter 12. This adapter ring 6 has an external toothing AV complementary to the internal toothing IV and also an internal profiling or internal toothing, via which the adapter ring 6 and thus the shaft adapter 12 is pressed onto a correspondingly complementary external profiling or external toothing of the hollow shaft W.

The proposed locking device SV can be advantageously adapted to different shaft diameters via the adapter ring 6.

Arranged radially to the shaft adapter 12, two brushes 2*a,* 2*b,* 3*a,* 3*b* are associated with each of the two slip rings 14*a,* 14*b* and are received by the housing SV-G. The brushes 2*a,* 2*b,* 3*a,* 3*b* are placed or contacted in a spring-biased manner against the associated slip rings 14*a,* 14*b*. In this case, the brushes 2*a,* 2*b,* 3*a,* 3*b*, which are associated with a slip ring 14*a,* 14*b* and form a pair, are arranged in such a way that they form an angle at the same height (FIG. 3, FIG. 4).

For the purpose of aligning the two form-fit elements 4, 6 to one another, a centering tapered portion 7 is formed on the end face of the form-fit element 6 and facing the form-fit element 4 (FIG. 6, FIG. 7). In the event of an axial offset between the form-fit element 4 and the form-fit element 6 or the hollow shaft W, the internal toothing IV can strike against this tapered portion or centering portion 7 in the course of a longitudinal displacement of the form-fit element 4 in the direction X-X in order to be aligned with respect to the external toothing AV and thus the hollow shaft W. In addition to a locking function, the form-fit element 6 therefore also has a centering function, which ensures coaxial alignment of the two form-fit elements 4, 6 relative to one another. This ensures an even distribution of force over the circumference of the two form-fit elements 4, 6 in the joined state.

Figure 8:
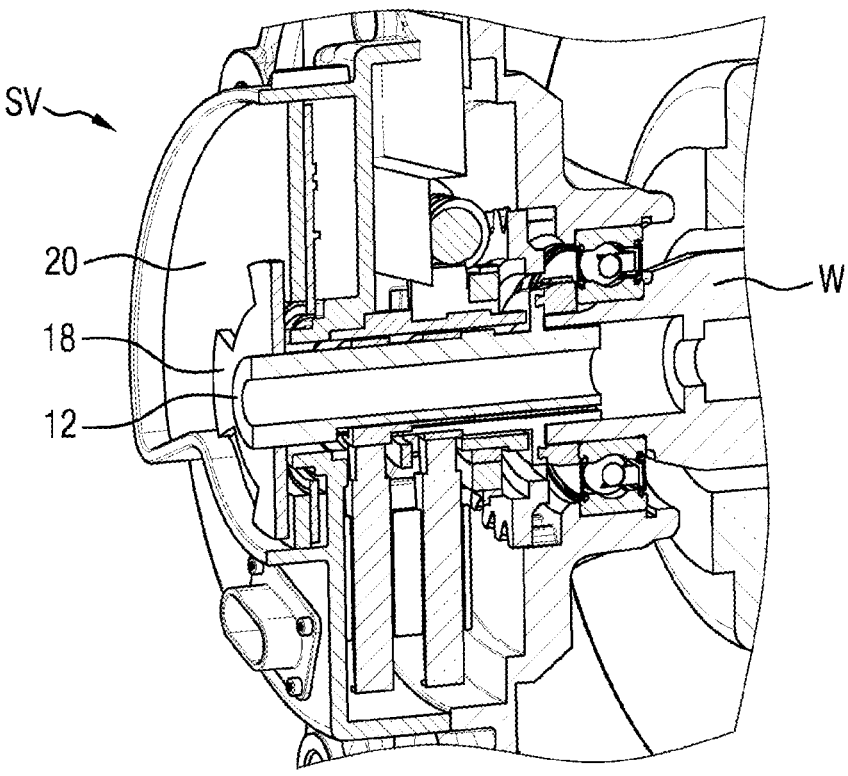
FIG. 8 is a perspective sectional view of the locking device.

The locking device SV further comprises, for example, an inductive position sensor assembly for detecting a position of the rotor of the synchronous machine connected to the shaft W in order to enable efficient electronic commutation of the synchronous machine. FIG. 8 illustrates an example of a position sensor assembly in the region of the outer end of the shaft adapter 12 or the end of the shaft adapter 12 that faces away from the shaft end.

A signal transmitter with a coil arrangement that is stationary relative to the housing SV-G and integrated into a printed circuit board 20 is provided and interacts with a sensor component in the form of a metal, disk-like element 18 that is stationary relative to the hollow shaft W. This element 18, which is arranged opposite the printed circuit board, is received by the plastic of the shaft adapter 12 and is fixed to the shaft adapter 12. This element 18 has individual radial, claw-like projections on its circumference, which as such cause a magnetic field acting on them to be detuned. At least these radial, claw-like projections can be magnetic, e.g. ferromagnetic. In a simple exemplary embodiment, this disk-like element 18 is made entirely of a non-magnetic metal, such as aluminum.

Alternatively, such a position sensor assembly can also be provided in the region of said form-fit elements 4, 6 or on the shaft side.

In addition to the aforementioned signal transmitter, sensor electronics for the position sensor assembly and motor electronics for controlling the electric drive EA are also integrated into the printed circuit board 20.

The proposed locking device represents a compact, space-saving and cost-effective solution within a drive train, in particular a vehicle in the sense of a parking lock or a locking actuator, according to which the locking mechanism is integrated into the electric motor EM and the locking device is integrated into the electric motor housing EM-G.

For a vehicle with such a locking device, this means that the vehicle in a parking situation in which the vehicle is stationary, can be locked or blocked, for example at the driver's request.

If the alignment of the shaft W in this parking situation is not such that it allows the locking by the form-fit element 4, the form-fit element 4, in a state in which it rests on the end face against the shaft-side complement or form-fit element 6 or against the external toothing AV, can be pretensioned or braced against the shaft W for engagement, via said screw drive—formed by the spindle S and the spindle nut SM—and said coil springs 18 along the shaft W and with a definable force. If the shaft W is then turned or rotated only slightly further, the form-fit element 4 engages with the form-fit element 6 and thus with the shaft 6 as soon as a corresponding alignment of the shaft W is achieved, which enables the engagement. Such a further rotation of the shaft W in the parking situation can be initiated by the vehicle system.

However, the aforementioned movement clearance between the two form-fit elements 4, 6 and in the circumferential direction of the shaft W also enables the following emergency scenario in the event of a vehicle fault in which the electric motor EM of the electric motor drive unit EM-AE fails.

If the electric motor EM fails while driving and the vehicle is then braked to a standstill on a road with an incline, the proposed locking device SV enables the vehicle, which is then rolling from a standstill, to be locked or blocked up to a maximum rotational speed of the shaft W or maximum speed of the vehicle, depending on the movement clearance.

The form-fit element 4 is engaged with the form-fit element 6 and thus to the shaft W, utilizing the movement clearance and up to the movement-clearance-dependent maximum rotational speed of the shaft W or the maximum speed of the vehicle, and thus brings the vehicle to a standstill.

By pretensioning or bracing the form-fit element 4, in a state in which the end face is in contact with the form-fit element 6 or the external toothing AV via the screw drive and the helical springs 18 and along the shaft W, with a definable force against the shaft W and until the point of engagement, the engagement finally takes place as soon as the shaft W is appropriately aligned with the form-fit element 4.

Although exemplary embodiments are explained in the preceding description, it should be noted that a large number of variations are possible. It should also be noted that the exemplary embodiments provided are merely examples and are not intended to restrict the scope of protection, applications and structure in any way. Instead, the above description gives a person skilled in the art a guideline for the implementation of at least one exemplary embodiment, wherein various changes may be made, especially with regard to the function and arrangement of the component parts described, without departing from the scope of protection as emerges from the claims and combinations of features that are equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A locking device for an electric motor drive unit, comprising:
   a locking device housing;
   a locking mechanism received by the locking device housing and configured to lock a lockable shaft of the electric motor drive unit;
   an electric drive received by the locking device housing and configured to actuate the locking mechanism;
   a multifunctional shaft adapter, which is substantially made of a plastic and received by the locking device housing and configured to connect to the lockable shaft;
   wherein the plastic of the shaft adapter is connected in an integrally bonded manner to a form-fit element for connection to the lockable shaft; and
   a position sensor assembly that detects a position of a rotor of an electric motor of the electric motor drive unit, the rotor connected to the lockable shaft to commutate the electric motor, the position sensor assembly received by the locking device housing and comprises:
   a signal transmitter; and
   a sensor component that is received in a fixed position by the plastic of the shaft adapter and at least partly made of metal, which interacts with the signal transmitter.

2. The locking device as claimed in claim 1, wherein the signal transmitter is fixed to the locking device housing and the sensor component is fixed to the lockable shaft.

3. The locking device as claimed in claim 1, further comprising:
   contacts embedded in the multifunctional shaft adapter for external excitation of the rotor.

4. The locking device as claimed in claim 1, wherein the sensor component is formed as a disk-like element that is at least partly made of metal.

5. The locking device as claimed in claim 4, wherein the signal transmitter an integral part of a printed circuit board and the disk-like element is arranged opposite the printed circuit board.

6. The locking device as claimed in claim 5, wherein the printed circuit board has motor electronics configured to control the electric motor drive unit and sensor electronics for the position sensor assembly.

7. An electric motor drive unit, for driving a vehicle comprising:
   a locking device comprising:
      a locking device housing;
      a locking mechanism received by the locking device housing and configured to lock a lockable shaft of the electric motor drive unit;
      an electric drive received by the locking device housing and configured to actuate the locking mechanism;
      a multifunctional shaft adapter, which is substantially made of a plastic and received by the locking device housing and configured to connect to the lockable shaft;
      wherein the plastic of the shaft adapter is connected in an integrally bonded manner to a form-fit element for connection to the lockable shaft; and
      a position sensor assembly that detects a position of a rotor of an electric motor of the electric motor drive unit, the rotor connected to the lockable shaft to commutate the electric motor, the position sensor assembly received by the locking device housing and comprises:
         a signal transmitter; and
         a sensor component that is received in a fixed position by the plastic of the shaft adapter and at least partly made of metal, which interacts with the signal transmitter; and
   a housing of the electric motor of the electric motor drive unit to which the locking device is attached.

8. A vehicle comprising an electric motor drive unit as claimed in claim 7.

* * * * *